B. P. TRICE.
VEHICLE BRAKE.
APPLICATION FILED MAR. 31, 1909.
933,680.
Patented Sept. 7, 1909.
2 SHEETS—SHEET 1.
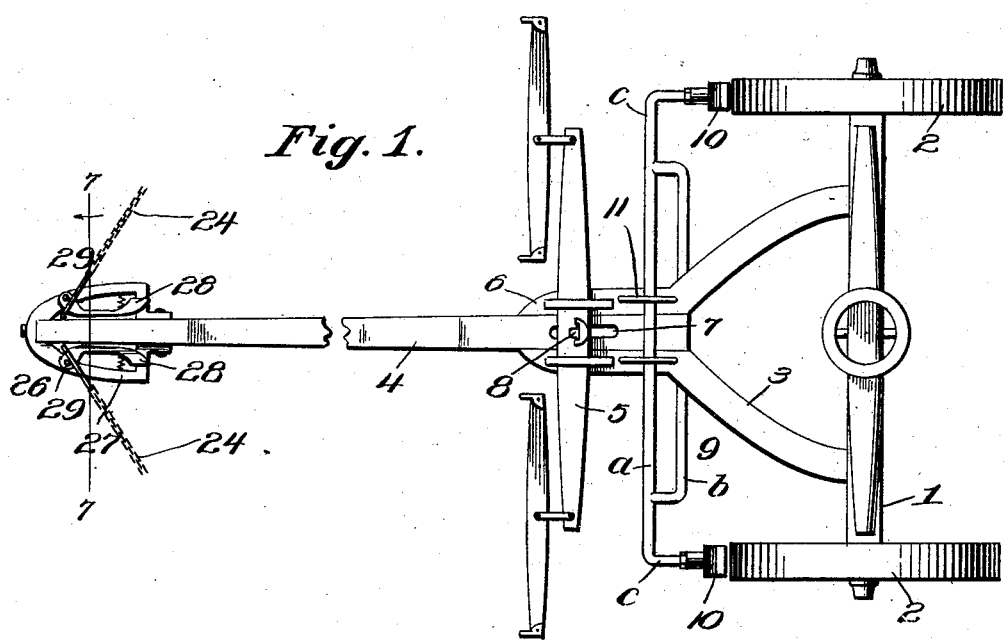
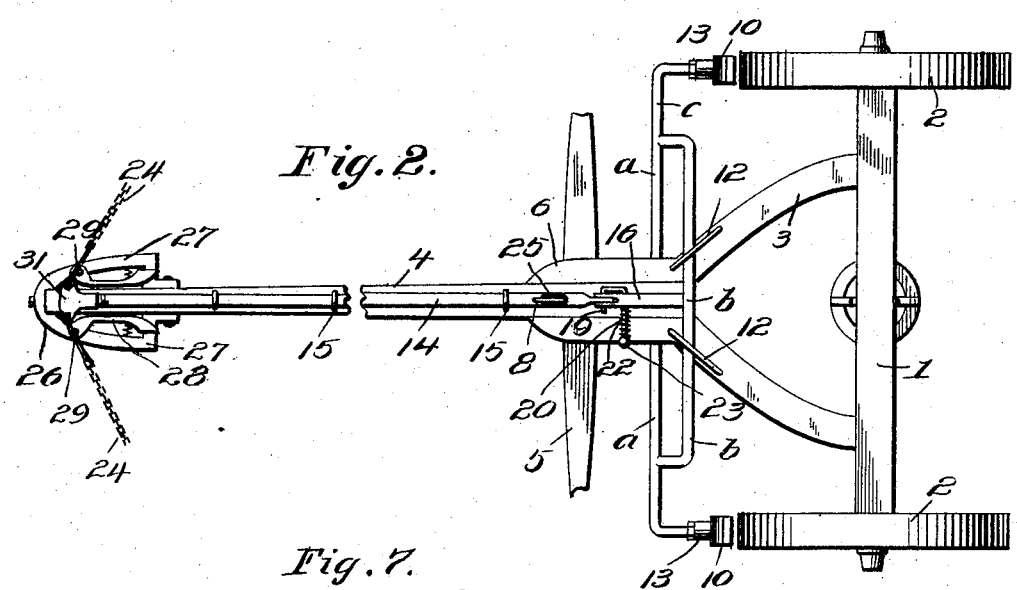
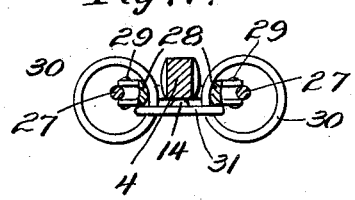
Inventor
Bennett P. Trice.
Witnesses
F. C. Gibson.
C. Bradway.
By Victor J. Evans
Attorney

B. P. TRICE.
VEHICLE BRAKE.
APPLICATION FILED MAR. 31, 1909.

933,680.

Patented Sept. 7, 1909.
2 SHEETS—SHEET 2.

Witnesses
F. C. Gibson.
C. Bradway.

Inventor
Bennett P. Trice.
By Victor J. Evans
Attorney

UNITED STATES PATENT OFFICE.

BENNETT P. TRICE, OF CLARKSVILLE, TENNESSEE, ASSIGNOR OF ONE-FOURTH TO ALFRED E. ANDERSON, OF CLARKSVILLE, TENNESSEE.

VEHICLE-BRAKE.

933,680.  Specification of Letters Patent.  Patented Sept. 7, 1909.

Application filed March 31, 1909. Serial No. 486,958.

*To all whom it may concern:*

Be it known that I, BENNETT P. TRICE, a citizen of the United States, residing at Clarksville, in the county of Montgomery and State of Tennessee, have invented new and useful Improvements in Vehicle-Brakes, of which the following is a specification.

This invention relates to a vehicle brake of that type adapted to be automatically set by the back draft of the horses as in going down grade, so that the driver is relieved of the trouble of setting the brakes by hand.

The invention has for one of its objects to improve and simplify the construction and operation of brake devices of this character so as to be comparatively simple and inexpensive to manufacture, reliable and efficient in use, and composed of comparatively few parts.

Another object of the invention is the provision of a brake-operating mechanism by which the shoes are released from the vehicle by a forward pull on the whiffletree while the brakes are set by a back pull on the yoke chains, there being novel means for detaching the whiffletree from the brake mechanism without setting the brake.

With these objects in view and others, as will appear as the description proceeds, the invention comprises the various novel features of construction and arrangement of parts which will be more fully described hereinafter and set forth with particularity in the claims appended hereto.

Figure 3:
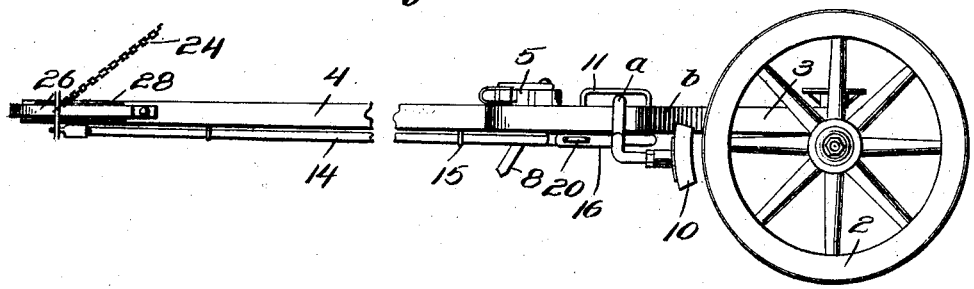
Figure 4:
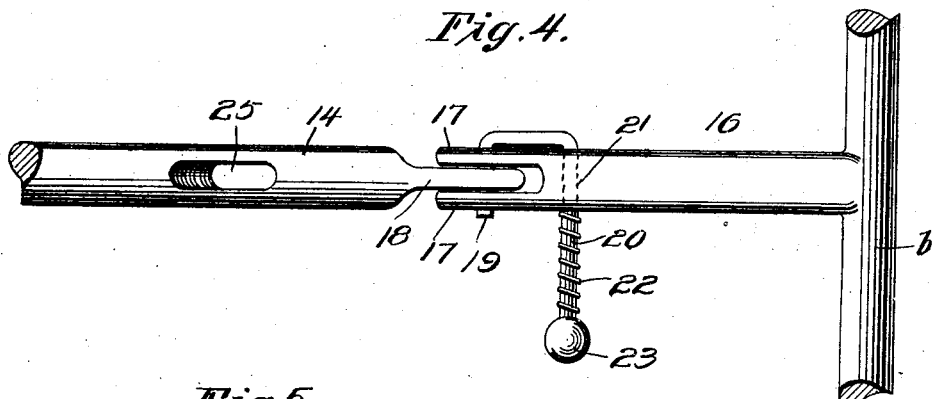
Figure 5:
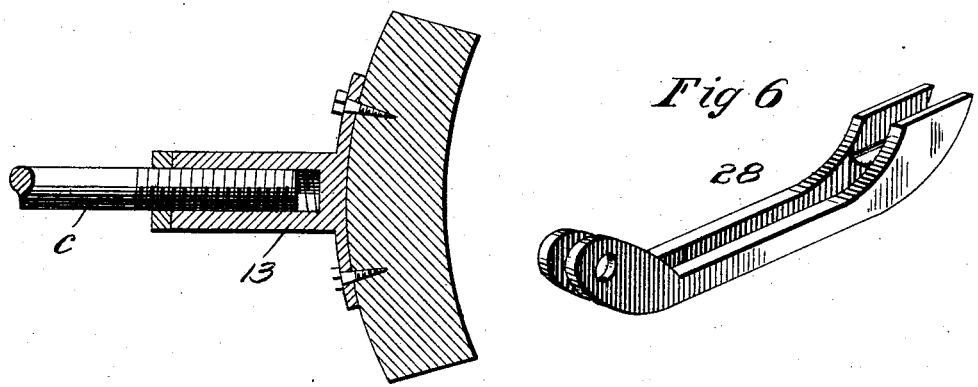
Figure 6:
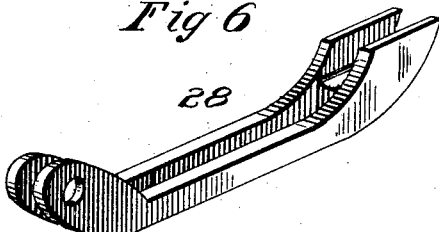

In the accompanying drawings, which illustrate one embodiment of the invention, Figure 1 is a plan view of the brake mechanism in applied position. Fig. 2 is a bottom plan view of Fig. 1. Fig. 3 is a side view. Fig. 4 is an enlarged detail view of the brake-setting rod and connection with the brake beam. Fig. 5 is a sectional view of a brake shoe and its connection with the brake beam. Fig. 6 is a perspective view of one of the spring-pressed members at the top of the vehicle tongue. Fig. 7 is a section on the line $x$—$x$ of Fig. 1 looking in the direction of the arrows.

Similar reference characters are employed to designate corresponding parts throughout the views.

Referring to the drawing, 1 designates the front axle of a vehicle running gear having the usual wheels 2 and hounds 3 to which is secured the tongue or pole 4. Applied to the tongue is the whiffletree 5 which moves back and forth on the forwardly-extending extremities 6 of the hounds. The tongue 4 has a longitudinal slot 7 through which extends the inclined pin 8 arranged in the whiffletree 5 for securing the same to the tongue. Behind the whiffletree is a brake tongue. Behind the whiffletree is a brake beam 9 extending transversely to the hounds and slidable back and forth thereon. The brake beam consists of rods $a$ and $b$ which extend, respectively, across the top and bottom of the hounds and are connected together at their ends and projecting from the points of connection are L-shaped extensions or arms $c$ that carry brake shoes 10. On the hounds are top and bottom staple-like guides 11 and 12, Figs. 1 and 2, for holding the brake beam on the hounds in such a manner as to permit back and forth movement for the setting and releasing of the brake shoes. The shoes are provided with socket pieces 13 that are interiorly threaded to screw on the extensions $c$, the shoes being arranged in coöperative relation with the front wheels 2.

Extending longitudinally under the tongue 4 is an operating rod 14 guided in staples or rings 15 secured to the under side of the tongue, and the rear end of the operating rod 14 is connected with a forwardly-extending arm 16 on the upper rod $a$ of the brake beam, said arm being disposed under the tongue, as shown in Fig. 2. The arm 16 is bifurcated and between the bifurcations 17 thereof extends the rear contracted end 18 of the rod 14. The rod and arm are connected together by a pivot 19, Figs. 2 and 4, extending through the bifurcations 17 and contracted extremity 18. The pivot 19 is releasably held in place so that the rod 14 can be detached whenever it is desired to back the vehicle without setting the brakes. For this purpose, the pivot is secured to an L-shaped rod 20 that has an arm parallel with the pivot that extends through an opening 21 in the central extension or member 16 of the brake beam, and on this arm is a helical compression spring 22 that has one end bearing against the member 16 and the other end bearing against an enlargement or abutment 23 of the rod 20, said abutment forming a handle whereby the pivot can be engaged or disengaged. By pressing the knob 23 toward the arm 16, the pivot 19 will be disengaged so as to disconnect the arm 16 from the operating rod 14 so as to thereby throw the operating mechanism out of use, as in backing the vehicle. Connected with the front end of the operating rod 14 are chains 24 for connection with the hames of the harness so that as the horses hold back as in going down a hill, the rod 14 will be moved backwardly to set the brake. The rear end of the rod is provided with a slot 25 through which the pin 8 on the whiffletree extends so as to pull the brake beam forwardly when the horses can take up the load when the end of a downward incline is reached. On the front end of the tongue is a metal frame or yoke 26 having rearwardly-extending bars or arms 27 with their middle portions spaced from the sides of the tongue so as to provide openings through which the chains 24 extend. Secured to each arm 27 are spring-pressed gripping members or retainers 28 having their forward ends pivoted at 29 to the frame 26 and their rear ends free. The members 28 extend longitudinally of the frame at opposite sides of the tongue. As a draft is exerted on the chains 24 by the horses holding back, as in going down hill, the chains will slip rearwardly between the members 28 and sides of the tongue until they reach the rear extremities of the arms 27. At the same time the rod 14 will be moved backwardly to set the brakes and the members 28 will grip the chains so as to maintain the brake shoes in engagement with the wheels in case the backward pull on the chains 28 by the horses is momentarily removed as in going over reaches or humps. As soon as the end of the downward incline is reached and the horses again take up the load, the whiffletree 5 is pulled forwardly and at the same time the rod 14 slides downwardly to thereby release the brake shoes.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

The chains 24 are provided at their front ends with rings 30, which embrace the arms 27 and the gripping members 28 as indicated most clearly in Fig. 7 and which rings are connected to a tip 31 fitted to the front end of the operating rod 14.

Having thus described the invention, what I claim is:—

1. The combination of a running gear including an axle, wheels thereon, a tongue connected with the axle, and a whiffletree movably mounted on the tongue, with a brake beam, shoes thereon arranged in co-operative relation with the wheels, an operating rod movably mounted on the tongue, means connecting the whiffletree with the rod whereby the forward movement of the whiffletree releases the brake shoes, and a spring-pressed device for detachably connecting the rod with the brake beam, a frame on the front end of the tongue, chains guided through the frame and connected with the said rod and with the hames of the harness, and devices for the frame for gripping the chains.

2. The combination of a running gear including an axle, wheels thereon, hounds connected with the axle, a tongue connected with the hounds, a whiffletree, a longitudinal slot in the tongue, a pin on the whiffletree and slidably mounted in the slot, with a brake beam consisting of a pair of parallel bars extending respectively over and under the hounds, brake shoes on the ends of the beam, a central arm extending forwardly from the bottom bar of the beam, an operating rod supported on the tongue and connected with the whiffletree pin, means for detachably connecting the rear end of the rod with the forward end of the said arm, and yoke chains connected with the front end of the operating rod for setting the brakes by the rearward draft of the animals.

3. In a vehicle brake mechanism, the combination of a tongue, a whiffletree movably mounted thereon, a brake beam having shoes, means for connecting the whiffletree with the brake beam whereby the forward movement of the whiffletree releases the brake shoes, an operating rod on the tongue and connected with the brake beam, a frame on the forward end of the tongue, chains connected with the said rod and guided by the frame, and spring-pressed members mounted on the frame and disposed at opposite sides of the tongue for releasably gripping the said chains.

In testimony whereof I affix my signature in presence of two witnesses.

BENNETT P. TRICE.

Witnesses:
L. C. HUFFMAN,
W. T. FLEMING.